United States Patent
Clements

(10) Patent No.: US 8,462,991 B1
(45) Date of Patent: Jun. 11, 2013

(54) USING IMAGES TO IDENTIFY INCORRECT OR INVALID BUSINESS LISTINGS

(75) Inventor: Melanie Clements, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 13/088,521

(22) Filed: Apr. 18, 2011

(51) Int. Cl.
*G06K 9/00* (2006.01)
*G01C 21/00* (2006.01)

(52) U.S. Cl.
USPC ............................ 382/112; 382/219; 701/409

(58) Field of Classification Search
USPC ................. 382/100, 103, 106, 112, 155, 162, 382/168, 173, 181, 195, 199, 209, 219, 232, 382/254, 274, 276, 286, 291, 294, 305, 312; 701/408, 409; 709/223, 203; 705/14.49
See application file for complete search history.

(56) References Cited

U.S. PATENT DOCUMENTS

| | | | | |
|---|---|---|---|---|
| 7,359,797 | B2 * | 4/2008 | Dorfman et al. | 701/408 |
| 8,010,407 | B1 * | 8/2011 | Santoro et al. | 705/14.49 |
| 8,037,166 | B2 * | 10/2011 | Seefeld et al. | 709/223 |
| 2010/0191797 | A1 * | 7/2010 | Seefeld et al. | 709/203 |

* cited by examiner

*Primary Examiner* — Seyed Azarian
(74) *Attorney, Agent, or Firm* — Lerner, David, Littenberg, Krumholz & Mentlik, LLP

(57) ABSTRACT

The present invention relates generally to identifying incorrect or fraudulent business listings. More specifically, business listings may be validated by comparing the listing information to information identified from images at or near the location of the business. For example, a plurality of geolocated street level images of various locations may be categorized using computer vision techniques. A particular business listing may include, among other information, a location (address, etc.) as well as a business category. The pre-categorized images are then selected based on the location of the particular business listing. The categories of the selected images are then compared to the category of the particular business listing to validate the business listing.

14 Claims, 5 Drawing Sheets

FIGURE 5
500

502 Access a plurality of images, each image associated with a geographic location 504 Identify image content 506 For each respective image of the plurality of images identify a category based on the image content 508 Associate the identified categories with the respective image of the plurality of images 510 Select a business listing assocaited with a business listing category and a geographic location 512 Identify a set of images based on their associated geographic locations and the geographic location associated with the business listing 514 Compare the categories of the set of images to the category of the business listing 516 Are the categories compatible?

NO → 518 Flag the business listing for further review

YES → 520 Flag the business listing as valid

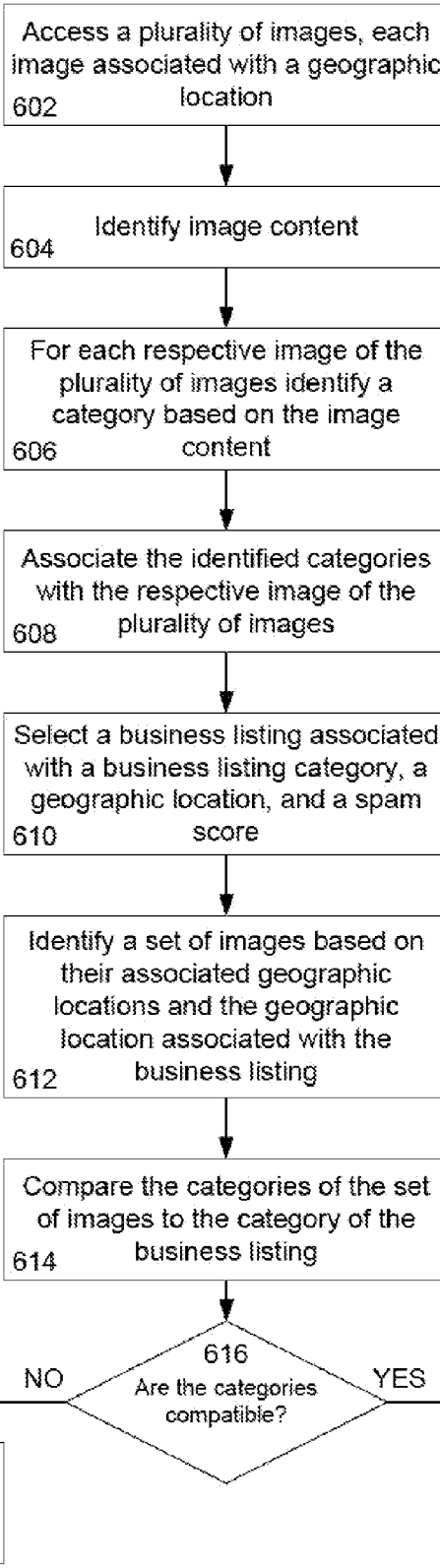

USING IMAGES TO IDENTIFY INCORRECT OR INVALID BUSINESS LISTINGS

BACKGROUND OF THE INVENTION

Various network-based search applications allow users to enter one or more search terms and in response, receive a list of search results. These systems use numerous different types of ranking algorithms to ensure that both the search results are relevant to the user's query and displayed in a useful way. For example, some systems such as Google Search and Google Map Search rank results based on reliability and safety of the search result, location of the user, etc. In addition, business listings included in search results may be ranked and displayed according to the prominence of the business. For example if the system may determine that the user is searching for a business, the search application may also display a list of prominent (or well known, respected or important) businesses based on the user's location.

Some third parties may attempt to defraud these services in order to misdirect users towards unrelated or fraudulent web sites. Some third parties may submit fake business information to the services by generating "fake location" spam. For example, a third party hijacker may set up of fake business listings in order to attract Internet traffic to their phone number or web site. These fake locations may often be in places where one would not expect such a business.

BRIEF SUMMARY OF THE INVENTION

The present invention relates generally to identifying incorrect or fraudulent business listings. More specifically, business listings may be validated by comparing the listing information to information identified from images at or near the location of the business. For example, a plurality of geolocated street level images of various locations may be categorized using computer vision techniques. A particular business listing may include, among other information, a location (address, etc.) as well as a business category. The pre-categorized images are then selected based on the location of the particular business listing. The categories of the selected images are then compared to the category of the particular business listing to validate the business listing.

If the categories are compatible, the business listing may be validated as a real business. Once identified as a real business, a spam score associated with the listing may be adjusted or the business listing may be flagged as valid or likely not to be fraudulent. Similarly, if the categories are not compatible, the business listing may be identified as possibly fraudulent. Possibly fraudulent business listings may have their associated spam score adjusted accordingly or the business listing may be flagged for further review.

One aspect of the invention provides a computer-implemented method. The method includes receiving business listing data. The business listing data includes data indicative of a business listing, a business category associated with the business listing, and a geographic location associated with the business listing. The method also includes accessing an image associated with the geographic location and processing, with a processor, the image to identify image content. The image content is content associated with the image. The method further includes identifying one or more image content category based on the image content and determining whether the business category associated with the business listing is compatible with the one or more image content categories.

In one example, the method also includes flagging the business as valid if the business category associated with the business listing is compatible with the one or more image content categories. In another example, the method also includes flagging the business listing as invalid if the business category associated with the business listing is not compatible with the one or more image content categories. In a further example, the method also includes flagging the business listing as requiring further review to determine whether the business listing is invalid if the business category associated with the business listing is not compatible with the one or more image content categories. In yet another example, the method also includes adjusting a spam score associated with the selected business listing downwards if the business category associated with the business listing is compatible with the one or more image content categories. In still a further example, the method also includes adjusting a spam score associated with the selected business listing upwards if the business category associated with the business listing is not compatible with the one or more image content categories. In another example, the business listing category describes information about a business of the business listing. In a further example, the method also includes accessing a plurality of images, each image of the plurality being associated with a geographic location; processing each particular image of the plurality of images to identify image content, wherein the image content is content associated with the particular image; for each particular image of the plurality of images, identifying one or more image content category based on the image content; and for each particular image of the plurality of images, associating the identified one or more content categories with the particular image. In yet another example, the method also includes selecting a subset of images of the plurality of images based on the geographic location associated with the business listing and determining whether the category associated with the business listing is compatible with the one or more image content categories associated with each image of the subset of images.

Another aspect of the invention provides a device. The device includes memory storing business listing data. The business listing data includes data indicative of a business listing, a business category associated with the business listing, and a geographic location associated with the business listing. The device also includes a processor to receive the business listing data; to access an image associated with the geographic location; and to process the image to identify image content. The image content is content associated with the image. The processor also identifies one or more image content category based on the image content and determines whether the business category associated with the business listing is compatible with the one or more image content categories.

In one example, the processor also flags the business as valid if the business category associated with the business listing is compatible with the one or more image categories. In another example, the processor also flags the business listing as invalid if the business category associated with the business listing is not compatible with the one or more image categories. In a further example, the processor also flags the business listing as requiring further review to determine whether the business listing is invalid if the business category associated with the business listing is not compatible with the one or more image categories. In yet another example, the processor also adjusts a spam score associated with the selected business listing downwards if the business category associated with the business listing is compatible with the one or more image categories one or more image. In another example, the processor also adjusts a spam score associated with the selected business listing upwards if the business category associated with the business listing is not compatible with the one or more image categories. In yet another example, the processor also accesses a plurality of images, each image of the plurality being associated with a geographic location; processes each particular image of the plurality of images to identify image content, wherein the image content is content associated with the particular image; for each particular image of the plurality of images, the processor identifies one or more image content category based on the image content; and for each particular image of the plurality of images, the processor associates the identified one or more content categories with the particular image. In a further example, the processor also selects a subset of images of the plurality of images based on the geographic location associated with the business listing and determines whether the category associated with the business listing is compatible with the one or more image content categories associated with each image of the subset of images. In another example, the business listing category describes information about a business of the business listing.

Yet another aspect of the invention provides a tangible computer-readable storage medium on which computer readable instructions of a program are stored, the instructions, when executed by a processor, cause the processor to perform a method. The method includes receiving business listing data. The business listing data includes data indicative of a business listing, a business category associated with the business listing, and a geographic location associated with the business listing. The method also includes accessing an image associated with the geographic location and processing, with a processor, the image to identify image content. The image content is content associated with the image. The method further includes identifying one or more image content category based on the image content and determining whether the business category associated with the business listing is compatible with the one or more image content categories.

In one example, the method also includes flagging the business as valid if the business category associated with the business listing is compatible with the one or more image content categories. In another example, the method also includes flagging the business listing as invalid if the business category associated with the business listing is not compatible with the one or more image content categories. In a further example, the method also includes flagging the business listing as requiring further review to determine whether the business listing is invalid if the business category associated with the business listing is not compatible with the one or more image content categories. In yet another example, the method also includes adjusting a spam score associated with the selected business listing downwards if the business category associated with the business listing is compatible with the one or more image content categories. In still a further example, the method also includes adjusting a spam score associated with the selected business listing upwards if the business category associated with the business listing is not compatible with the one or more image content categories. In another example, the business listing category describes information about a business of the business listing. In a further example, the method also includes accessing a plurality of images, each image of the plurality being associated with a geographic location; processing each particular image of the plurality of images to identify image content, wherein the image content is content associated with the particular image; for each particular image of the plurality of images, identifying one or more image content category based on the image content; and for each particular image of the plurality of images, associating the identified one or more content categories with the particular image. In yet another example, the method also includes selecting a subset of images of the plurality of images based on the geographic location associated with the business listing and determining whether the category associated with the business listing is compatible with the one or more image content categories associated with each image of the subset of images. In another example, the business listing category describes information about a business of the business listing.

BRIEF DESCRIPTION OF THE DRAWINGS

FIG. 5 is an exemplary flow diagram in accordance with an aspect of the invention.
FIG. 6 is an exemplary flow diagram in accordance with an aspect of the invention.

DETAILED DESCRIPTION

The aspects, features and advantages of the present invention will be appreciated when considered with reference to the following description of embodiments and accompanying figures. The same reference numbers in different drawings may identify the same or similar elements. Furthermore, the following description does not limit the present invention; rather, the scope of the invention is defined by the appended claims and equivalents.

In one aspect of the invention, a server accesses a plurality of images. Each of the images is associated with a geographic location. The server then identifies image content of each image of the plurality of images. For each given image, the server identifies a category based on the identified image content for the given image. The identified category is then associated with the given image.

The server then selects a business listing associated with a business listing category and a geographic location. The business listing category may, for example, be used to identify information about the business such as the type of the business, etc. The server then identifies a set of images from the plurality of images based on the geographic location associated with the selected business listing.

The server then compares the categories associated with the identified set of images to the category of the business listing. If the categories are compatible, the server flags the business as valid. If the categories are not compatible, the server may flag the business listing as invalid or as requiring further review. Thus, in one example, if a client device may query the server requesting a set of business listings. In response, the server may withhold from the query results any business listings which are flagged as invalid.

Figure 1:
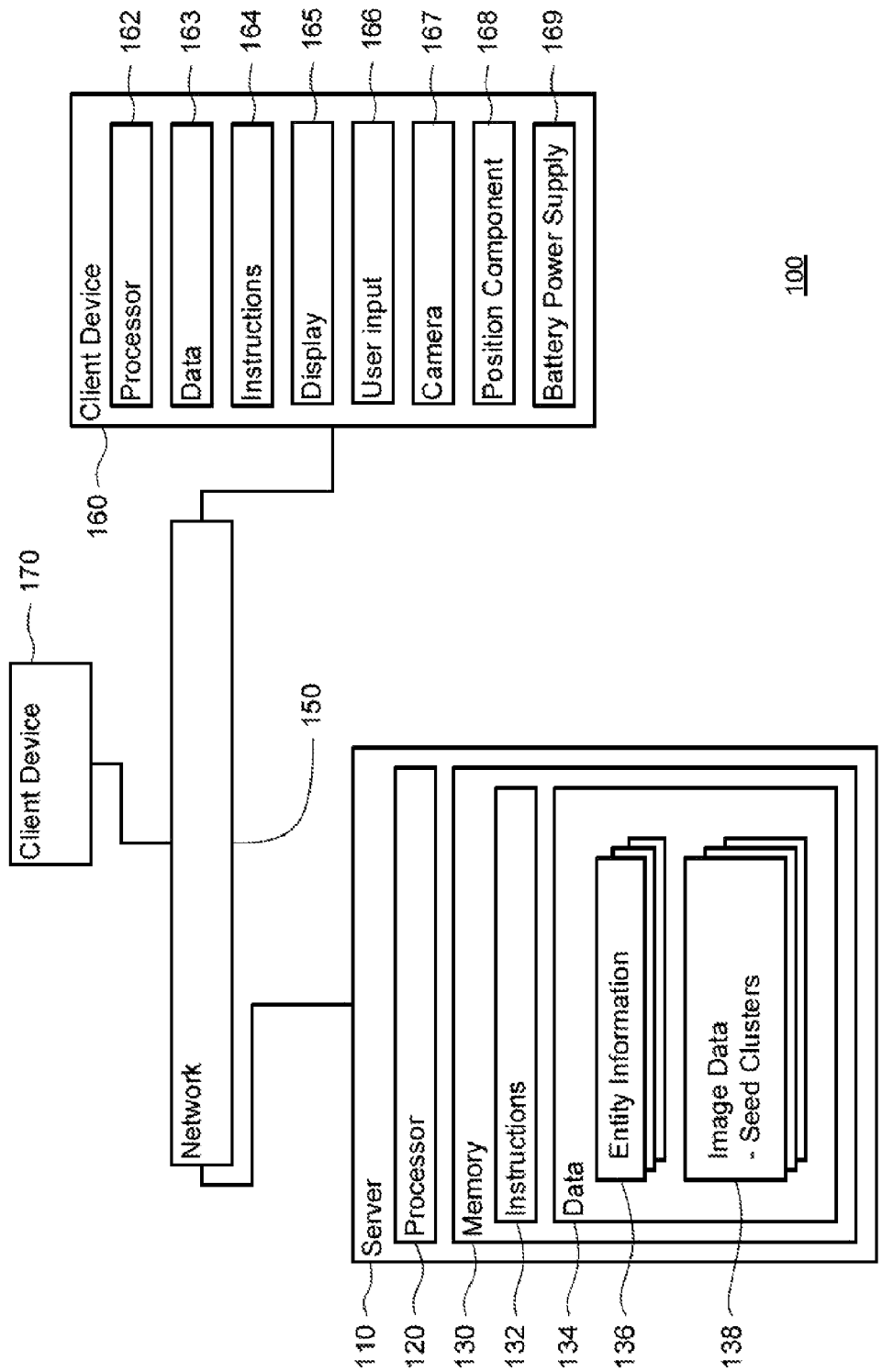
FIG. 1 is a functional diagram of a system in accordance with an aspect of the invention.
Figure 2:
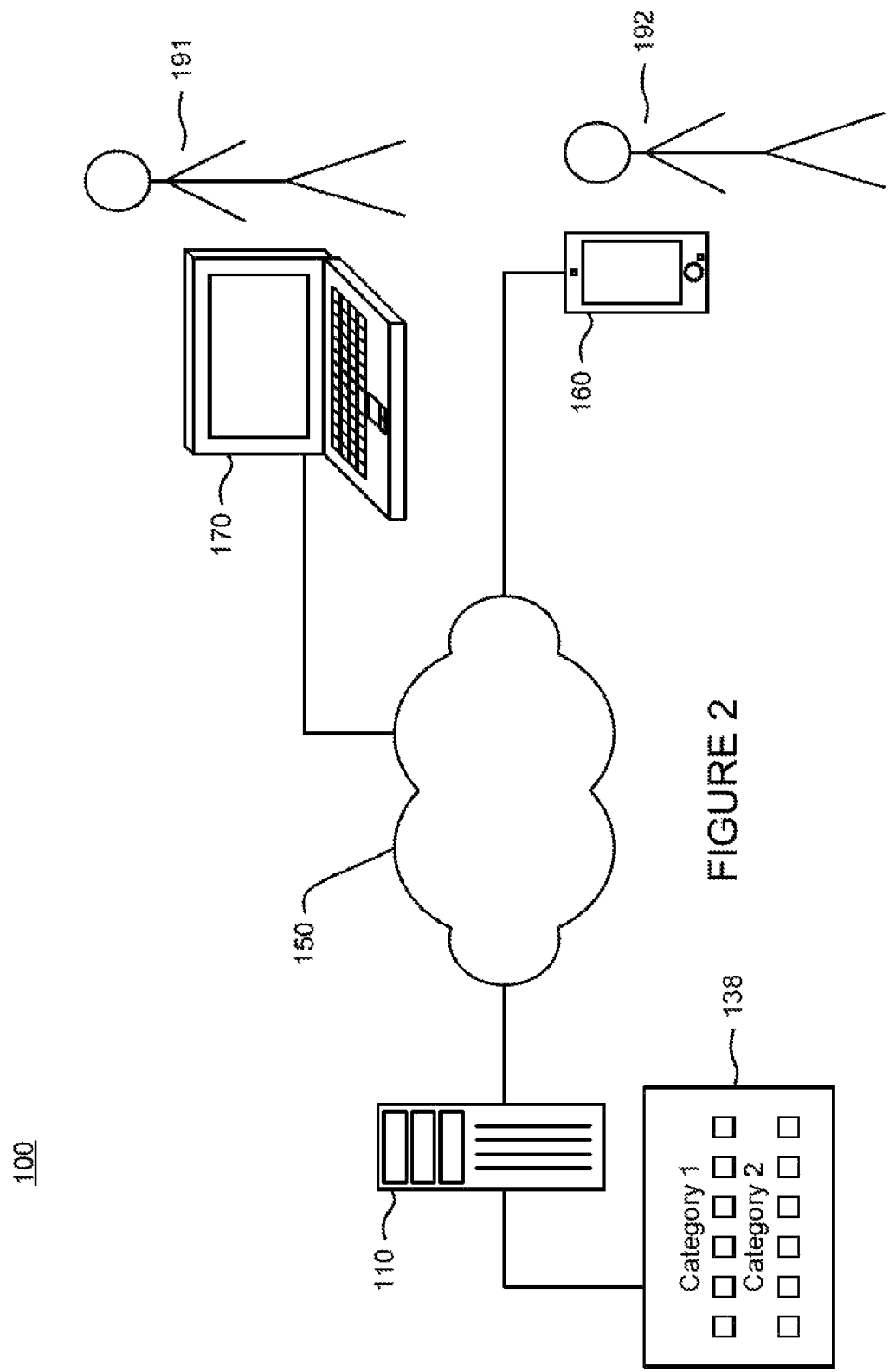
FIG. 2 is a pictorial diagram of the system of FIG. 1.

As shown in FIGS. 1-2, a system 100 in accordance with aspects of the invention includes a computer 110 containing a processor 120, memory 130 and other components typically present in general purpose computers. The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a cloud storage, hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by processor 120. For example, instructions 132 may be stored as computer code on the computer-readable medium. In that regard, the terms "instructions" and "programs" may be used interchangeably herein. The instructions may be stored in object code format for direct processing by processor 120, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with instructions 132. For instance, although the architecture is not limited by any particular data structure, data 134 may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations or servers) or information that is used by a function to calculate the relevant data.

Data 134 may include entity information 136. This information includes various business or other listings. The entity information may be compiled from a plurality of data providers, such as business listing websites (yellow pages), government web sites, etc. An listing may be associated with a name or title (such as "Tom's Pizzeria"), a category (such as "pizza", "Italian restaurant" or "ballpark"), a geographic location (such as "123 Main Street" or latitude and longitude), and various other types of information such as links to the entity's website, user reviews, images, phone numbers, links to additional information pages, etc.

The business listing categories may be based on existing standardized categories. Alternatively, special categories may be generated manually or based on the context of the business listing data. In some examples, the categories may be relatively broad, such as "storefront," "office building," "open space," etc. These general categories may be mapped to more specific categories, such as "pizzeria, ballpark," etc.

While the examples below relate generally to "business" listings it will be understood that the systems and methods described may be used with all types of listings, such as for example, government listings, clubs, monuments, and other geolocated objects. Thus, these items (or various combinations of these items) may also be considered "business listings" as used herein.

Data 134 may also include image data 138 associated with geographic locations. For example, street level images, taken by cameras mounted onto vehicles, may be associated with a particular geographic location, such as latitude and longitude. These images may also include aerial views, views of the inside of a building, and other non-street level views collected from various image sources or submitted by users.

The image data 380 may also include seed clusters. Each seed cluster may include a plurality of images with similar content which has been pre-categorized. For example, one seed cluster may include a plurality of desert images from Death Valley, Calif. Another seed cluster may include a plurality of urban images from a particular city, neighborhood, or city block. Thus, the seed clusters may be categorized based on the content of the images. Exemplary categories may be fairly general or somewhat specific and may include, but are not limited to items like "forest," "field," "body of water," "town," "city," "construction site," "storefront," "highway," "historical monument," etc. In one example, shown in FIG. 2, the seed clusters may be stored by server 110 based on the respective category of the seed cluster. As will be described in more detail below, these seed clusters may be used to identify content in other images.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to client devices 160, 170. In this instance, the client devices will typically still be at different nodes of the network than any of the computers comprising server 110.

Network 150, and intervening nodes between server 110 and client devices 160, 170, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that the system 100 can include a large number of connected computers.

Each client device 160, 170 may be configured similarly to the server 110, with a processor, memory and instructions as described above. Each client device 160 or 170 may be a personal computer intended for use by a person 191-192, and have all of the components normally used in connection with a personal computer such as a central processing unit (CPU)

162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and end user input 166 (e.g., a mouse, keyboard, touch-screen or microphone). The client device may also include a camera 167, position component 168, accelerometer, speakers, a network interface device, a battery power supply 169 or other power source, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

It will be understood that geographic locations may be expressed in various ways including but not limited to latitude/longitude positions, street addresses, points on a map (such as when a user clicks on a map), building names, other data capable of identifying one or more geographic locations, and ranges of the foregoing.

In addition to the operations described above and illustrated in the figures, various operations in accordance with aspects of the invention will now be described. It should be understood that the following operations do not have to be performed in the precise order described below. Rather, various steps can be handled in a different order or simultaneously, and steps may also be added or omitted.

Figure 3:
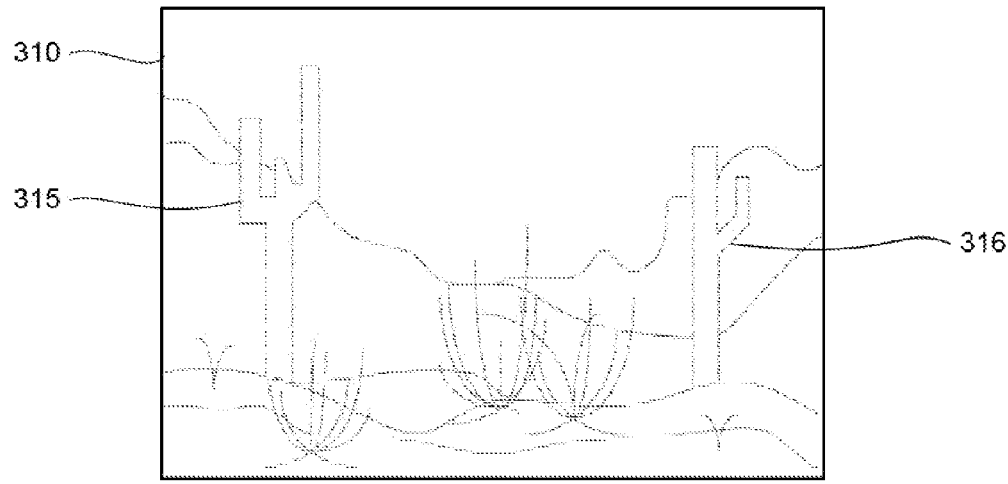
FIG. 3 is an exemplary image in accordance with an aspect of the invention.
Figure 4:
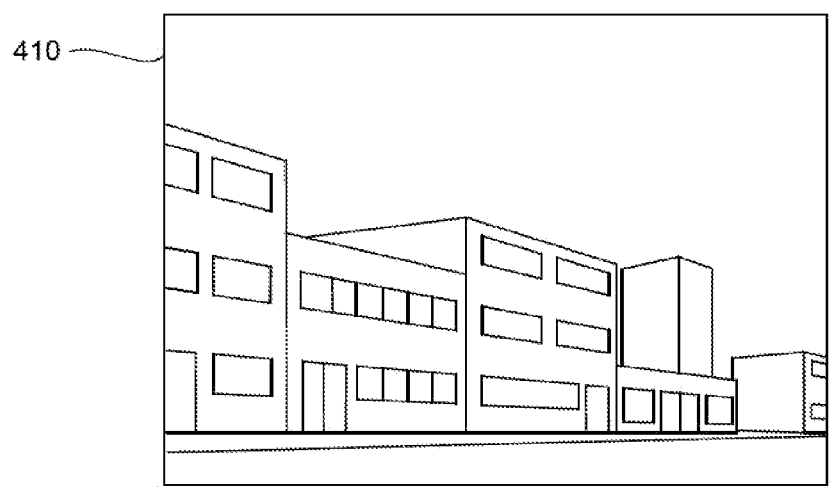
FIG. 4 is another exemplary image in accordance with an aspect of the invention.

As shown in the exemplary flow diagram 500 of FIG. 5, a server may access a plurality of images as shown in block 502. Each of the images is associated with a geographic location. For example, FIGS. 3 and 4 provide images 310 and 410 each associated with geographic locations (geolocations). Image 310 is an image of a desert scene taken by a camera located at geolocation coordinates 312 (01,02). Similarly, image 410 is an image of a city scene taken by a camera located at an address, such as "125 Main Street, AnyTown, AnyState".

The server may then identify image content of each image of the plurality of images as shown in block 504 of FIG. 5. For example, the server may select a particular image in order to identify the content of the image. In order to do so, the server may scan the particular image and use image pattern matching techniques to identify the content. In one example, the server may access the seed clusters of images and compare each particular image to a plurality of the seed clusters. The server may then determine whether and which seed clusters include similar content as the particular image by pattern matching between the images. The content of the most closely related seed cluster or clusters may then be used to describe the content of the particular image and categorize the particular image.

As shown in the example of FIG. 3, the server may scan image 310 and compare it to a plurality of seed clusters in order to identify the content of image 310. The server may determine whether any of the seed clusters include similar content. Here, image 310 may be compared to various seed clusters of desert images or urban images from different locations in order to determine which seed cluster is most closely related to image 310. For example, if the most closely related seed clusters include images of cacti and images of Death Valley, Calif., the content of the particular image may be identified as images of cacti from Death Valley, Calif.

The server may then categorize the particular image based on the identified content as shown in block 506 of FIG. 5. Returning to FIG. 3, based on the seed cluster identified by comparing to image 310, the server may categorize image 310 as a "cactus," "Death Valley, Calif.," "dry desert," etc. Similarly, image 410 of FIG. 4 may be categorized, based on its content, as a "town," "city," "business district," etc.

Once identified, the category or categories may be associated with the particular image, and the association stored in memory accessible by the server for later use, for example, as shown in block 508 of FIG. 5. It will be understood that based on the content identified in an image, the server may associate only a single category or a plurality of categories with an image.

The server may select a business listing associated with a business listing category and a geographic location as shown in block 510. The business listing category may, for example, be used to identify information about the business such as the type of the business, etc. As noted above, each business listing may be associated with a geographic location and a business listing category. For example, a business "Gas Station A" may be located proximate to or at 125 Main Street, AnyState. The business may be associated with the business listing category "fueling station" or "truck stop." Similarly, a business "Snowmobile Business A" may be located proximate to geolocation coordinates or at (01,02) and associated with the category of "snowmobile repair" or "snowmobile rentals."

The server may identify a set of one or more images of the plurality of images based on the associated geographic locations and the geographic location associated with the selected business listing as shown in block 512 of FIG. 5. For example, the server may identify one or more images associated with geographic locations at or near the geographic location of the selected business listing. Thus, for example, for "Gas Station A," the server may identify at least image 320 based on the geographic locations associated with this business and this image. Similarly, "Snowmobile Business A" the server may identify at least image 310 based on the geographic locations associated with this business and the image.

The server may then compare the categories associated with the set of images to the category of the business listing as shown in block 514 of FIG. 5. For example, once the server has identified both a business listing and at least one image based on their respective geographic locations, the server may compare the business listing category associated with the business listing category to the image category associated with the at least one image to determine whether the categories are compatible.

Whether two categories are compatible may be based on a set of pre-defined rules generated manually. For example, the rules may be a table listing whether or not a particular category is compatible with all of the other categories. In another example, the rules may include whether a particular combination of categories is compatible with one or more other categories. For example, the categories "trees" and "mountain range" may be compatible with "forests" but not "farms," whereas "trees" alone may be compatible with "forest." This data may also be supplemented through automatic analysis of existing data. For example, the server may look for co-occurrence of terms in known legitimate businesses and may also use data from the pre-defined rules.

Returning to the example above, "Snowmobile Business A" may be associated with the category "snowmobile rentals." The identified image 310 identified based on the corresponding geographic locations described above, may be identified with "dry desert." The server may determine that the categories "snowmobile rental" and "desert" are not likely to be compatible or are simply not compatible, because snowmobile rentals are not likely to be useful (or found) in a desert area.

In another example, "Gas Station A" may be associated with the category "fueling stations." The identified image 320, identified based on the corresponding geographic locations described above, may be associated with image category "town." The server may determine that the categories "fueling station" and "town" are likely to be compatible or are compatible because fueling stations may be found in towns.

Returning to FIG. 5, if the categories are compatible as shown in block 516, the server may flag the business as valid as shown in block 520. If the categories are not compatible, the server may flag the business listing as invalid or as requiring further review, for example to determine whether the business listing is invalid, as shown in block 518.

In another example, shown in the exemplary flow diagram 600 of FIG. 6, a server accesses a plurality of images at block 602. Each of the images is associated with a geographic location. The server then identifies image content of each image of the plurality of images at block 604. For each given image, the server identifies a category based on the identified image content for the given image at block 606. The identified category is then associated with the given image at block 608.

The server then selects a business listing associated with a business listing category and a geographic location at block 610. The business listing category may, for example, be used to identify information about the business such as the type of the business, etc. The server then identifies a set of images of the plurality of images based on the associated geographic locations and the geographic location associated with the selected business listing at block 612.

The server then compares the categories associated with the set of images to the category of the business listing at block 614. If the categories are compatible at block 616, the server adjusts a spam score associated with the selected business listing downwards as shown in block 620. If the categories are not compatible, the server adjusts a spam score associated with the selected business listing upwards at block 618.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method, the method comprises:
   receiving business listing data, wherein the business listing data includes data indicative of a business listing, a business category associated with the business listing, and a geographic location associated with the business listing;
   accessing an image associated with the geographic location;
   processing, with a processor, the image to identify image content, wherein the image content is content associated with the image;
   identifying one or more image content category based on the image content; determining whether the business category associated with the business listing is compatible with the one or more image content categories;
   flagging the business as valid if the business category associated with the business listing is compatible with the one or more image content categories; and
   adjusting a spam score associated with the selected business listing downwards if the business category associated with the business listing is compatible with the one or more image content categories.

2. The method of claim 1, further comprising flagging the business listing as invalid if the business category associated with the business listing is not compatible with the one or more image content categories.

3. The method of claim 1, further comprising flagging the business listing as requiring further review if the business category associated with the business listing is not compatible with the one or more image content categories.

4. The method of claim 1, wherein the business listing category describes information about a business of the business listing.

5. The method of claim 1, further comprising:
   accessing a plurality of images, each image of the plurality being associated with a geographic location;
   processing each particular image of the plurality of images to identify image content, wherein the image content is content associated with the particular image;
   for each particular image of the plurality of images, identifying one or more image content category based on the image content; and
   for each particular image of the plurality of images, associating the identified one or more content categories with the particular image.

6. The method of claim 1, further comprising:
   selecting a subset of images of the plurality of images based on the geographic location associated with the business listing; and
   determining whether the category associated with the business listing is compatible with the one or more image content categories associated with each image of the subset of images.

7. A device comprising:
   memory storing business listing data, wherein the business listing data includes data indicative of a business listing, a business category associated with the business listing, and a geographic location associated with the business listing;
   a processor to:
   receive the business listing data;
   access an image associated with the geographic location;
   process the image to identify image content, wherein the image content is content associated with the image;
   identify one or more image content category based on the image content;
   determine whether the business category associated with the business listing is compatible with the one or more image content categories;
   flag the business as valid if the business category associated with the business listing is compatible with the one or more image content categories; and
   adjust a spam score associated with the selected business listing downwards if the business category associated with the business listing is compatible with the one or more image content categories.

8. The device of claim 7, wherein the processor further flags the business as valid if the business category associated with the business listing is compatible with the one or more image categories.

9. The device of claim 7, wherein the processor further flags the business listing as requiring further review if the business category associated with the business listing is not compatible with the one or more image categories.

10. The device of claim 7, wherein the processor further adjusts a spam score associated with the selected business listing upwards if the business category associated with the business listing is not compatible with the one or more image categories.

11. A tangible computer-readable storage medium on which computer readable instructions of a program are stored, the instructions, when executed by a processor, cause the processor to perform a method, the method including:
- receiving business listing data, wherein the business listing data includes data indicative of a business listing, a business category associated with the business listing, and a geographic location associated with the business listing;
- accessing an image associated with the geographic location;
- processing, with a processor, the image to identify image content, wherein the image content is content associated with the image;
- identifying one or more image content category based on the image content;
- determining whether the business category associated with the business listing is compatible with the one or more image content categories; and
- flagging the business as valid if the business category associated with the business listing is compatible with the one or more image content categories; and
- adjusting a spam score associated with the selected business listing downwards if the business category associated with the business listing is compatible with the one or more image content categories.

12. The tangible computer-readable storage medium of claim 11, wherein the method further comprises:
- accessing a plurality of images, each image of the plurality being associated with a geographic location;
- processing each particular image of the plurality of images to identify image content, wherein the image content is content associated with the particular image;
- for each particular image of the plurality of images, identifying one or more image content category based on the image content; and
- for each particular image of the plurality of images, associating the identified one or more content categories with the particular image.

13. The tangible computer-readable storage medium of claim 11, wherein the method further comprises:
- selecting a subset of images of the plurality of images based on the geographic location associated with the business listing; and
- determining whether the category associated with the business listing is compatible with the one or more image content categories associated with each image of the subset of images.

14. The tangible computer-readable storage medium of claim 11, wherein the method further comprises flagging the business listing as requiring further review if the business category associated with the business listing is not compatible with the one or more image categories.

* * * * *